United States Patent [19]

Eckstein

[11] 4,412,766
[45] Nov. 1, 1983

[54] APPARATUS FOR CHUCKING AND RELEASING OF A CONICAL SHANK OF A TOOL OR AN ADDITIONAL AGGREGATE ON TOOL MACHINES, IN PARTICULAR DRILLING AND MILLING MACHINES

[75] Inventor: Rolf Eckstein, Rödental, Fed. Rep. of Germany

[73] Assignee: Werkzeugmaschinenfabrik Adolf Waldrich Coburg GmbH & Co., Coburg, Fed. Rep. of Germany

[21] Appl. No.: 214,834

[22] Filed: Dec. 10, 1980

[30] Foreign Application Priority Data

Dec. 21, 1979 [DE] Fed. Rep. of Germany ... 7935975[U]

[51] Int. Cl.³ .......................... B23B 31/04; B23C 5/26
[52] U.S. Cl. .................................. 409/233; 279/1 E; 408/239 A; 409/144
[58] Field of Search ............... 409/233, 230, 231, 232, 409/234, 144, 218; 408/239, 239 A; 29/26 A; 279/4, 1 E, 8

[56] References Cited

U.S. PATENT DOCUMENTS

| 2,994,250 | 8/1961 | Walter et al. ........................ 409/233 |
| 3,262,369 | 7/1966 | Piotrowski ........................... 409/233 |
| 3,311,024 | 3/1967 | Daugherty ........................... 409/233 |
| 3,424,055 | 1/1969 | Rollat ................................... 409/233 |
| 3,450,002 | 6/1969 | Shotter ................................ 409/230 |
| 3,753,383 | 8/1973 | Schmidt ............................... 409/233 |
| 3,757,637 | 9/1973 | Eich et al. .......................... 409/233 X |

FOREIGN PATENT DOCUMENTS

| 2412850 | 10/1974 | Fed. Rep. of Germany ...... 409/233 |
| 499990 | 3/1976 | U.S.S.R. .............................. 409/233 |

Primary Examiner—Z. R. Bilinsky
Attorney, Agent, or Firm—Flynn, Thiel, Boutell & Tanis

[57] ABSTRACT

An apparatus for chucking and releasing a conical shank of a tool or an additional aggregate on tool machines, particularly drilling and milling machines. The apparatus has a hollow spindle which is supported in a spindle housing and has at its lower end which faces the conical shank a receiving cone for the shank. A draw rod is supported for axial movement limited by a lower and an upper stop, is rotatably movable in the spindle, has at its end which faces the shank threads which can be screwed into threads on the shank, and is connected at its upper end to a drive motor rotor so as to be fixed against rotation but axially movable with respect thereto. Both stops are provided on a sleeve which concentrically surrounds the draw rod. The sleeve is supported on a spring arrangement. It is movable axially downwardly with respect to the spindle under the action of a hydraulically operated piston against the chucking force of the spring arrangement in a direction toward the receiving cone.

11 Claims, 3 Drawing Figures

APPARATUS FOR CHUCKING AND RELEASING OF A CONICAL SHANK OF A TOOL OR AN ADDITIONAL AGGREGATE ON TOOL MACHINES, IN PARTICULAR DRILLING AND MILLING MACHINES

FIELD OF THE INVENTION

This invention relates to an apparatus for chucking and releasing a conical shank of a tool or an additional aggregate on tool machines, particularly drilling and milling machines.

BACKGROUND OF THE INVENTION

An apparatus of the foregoing type typically has a hollow drive spindle which is supported in a spindle housing and has at its lower end which faces the conical shank a receiving cone for the shank. A draw rod is rotatably supported in the spindle and is movable axially between positions defined by a lower and an upper stop, which draw rod has at its lower end which faces the shank threads which can be screwed into threads provided in the shank and is connected at its upper end to a drive motor rotor so as to be fixed against rotation but axially movable relative thereto. A spring arrangement is arranged in a recess of the spindle and acts to effect chucking through the draw rod, which spring arrangement supports the lower stop.

In the case of such a conventional apparatus, for example German Auslegeschrift No. 2 045 604, (corresponds to U.S. Pat. No. 3,757,637), the shank of the tool or of an additional aggregate, for example an angle milling head or an adapter, is introduced into a receiving cone through a relative movement between the spindle housing, which in the known apparatus is a spindle carriage, and the shank. Driven by the drive motor, the thread of the draw rod screws into the thread of the shank, whereby after part of this screwing-in movement the draw rod will rest with a collar on the lower stop and, upon further rotation of the draw rod, the angle milling head is lifted up until it approximately rests on the spindle carriage which forms the spindle housing. The angle milling head can then be chucked on the spindle carriage by means of fastening screws or hydraulically operated clamping bolts. The chucking of a heavy tool occurs in a similar manner, but the conical tool shank is fully pulled into the receiving cone until it rests fixedly on same and the drive motor is automatically switched off. Due to manufacturing imprecisions, a conical shank which is constructed as a steep-angle taper can become jammed in the receiving cone. If this is the case, the draw rod unscrews through a reversed direction of rotation of its drive motor from the thread of the shank until a further movement of the draw rod is limited by the upper stop. The draw rod now presses the jammed shank out of the receiving cone. The tool or the angle milling head is released suddenly and falls downwardly due to its own weight until the draw rod rests on the lower stop. Since only a few threads are still in engagement and the thread is constructed according to the DIN-norm as a V-thread, these few threads are highly stressed and are thus exposed to rapid wear. It can even happen that the threads break off. Therefore, the threads must be examined regularly with respect to such wear. In the lowered position of the draw rod, same also serves to swing the angle milling head which hangs on it into a different angular position through rotation of the draw rod.

In the case of a different conventional apparatus for chucking and releasing a conical shank of a tool, for example German OS No. 23 16 605, the draw rod is surrounded by an ejector pipe which is concentric with respect to the draw rod to avoid the abovelisted disadvantages. After separation of the thread connection between the draw rod and tool shank, the ejector pipe is moved in an axial direction through a suitable drive connection and ejects the conical tool shank from the receiving cone. Since, however, the shank is already released from the draw rod, this conventional apparatus is suited only for lighter tools on horizontal drilling and milling systems. Heavier tools must be gripped by an additional tool exchanger. When using this known apparatus on tool machines with a vertical spindle there exists an increased danger of an accident, because the ejected tool may suddenly fall downwardly if a tool-changing apparatus was not moved into position prior to this.

In a further conventional device for chucking and releasing the tool shank on tool machines, for example German OS No. 24 12 850, the draw rod is surrounded by a threaded sleeve which can be screwed into threads in the spindle. The thread pitch of the thread sleeve and the thread pitch of the thread which is provided at the end of the draw rod correspond. Cooperating stops are provided on the thread sleeve and on the draw rod which permit a relative rotation between both parts of slightly less than one rotation. Also, a spring which is initially tensioned in an axial direction is provided between both parts. Upon starting the release operation, the draw rod first rotates by itself but, due to the initially tensioned spring, it cannot move upwardly in an axial direction. Since axial movement of the draw rod is prevented, the conical shank is pressed out of the receiving cone. After slightly less than one rotation, the stops on the thread sleeve and draw rod will rest on one another. Upon further rotation of the draw rod, the thread sleeve is also rotated due to the stops and is moved upwardly in the same degree as the draw rod. The thread of the draw rod can now screw out of the shank. The function of this known apparatus, however, is to a great degree dependent on the friction between the cooperating elements and is thus susceptible to trouble. A further important disadvantage of this known apparatus is its inability to lift heavy additional aggregates, especially angle milling heads, which are connected to the spindle, to couple its spindle carrier with the spindle, and if needed to swing the angle milling head quickly, safely and without any further auxiliary means about the axis of the spindle into a different working position.

The basic purpose of the invention is therefore to produce an apparatus of the abovementioned type for chucking and releasing a conical shank of a tool or an additional aggregate on tool machines, in particular drilling and milling machines, which by avoiding the above disadvantages works substantially wear-free, permits a secure chucking and releasing of the shank and, if desired, also permits rotation of the shanks of heavier additional aggregates, like angle milling heads, without any further auxiliary means.

SUMMARY OF THE INVENTION

This is achieved according to the invention by providing both of the stops on a sleeve which concentrically surrounds the draw rod, is supported on the spring arrangement, and is movable axially downwardly with respect to the spindle under the action of a hydraulically operated piston against the chucking force of the spring arrangement in a direction toward the receiving cone.

The sleeve which is movable by means of the hydraulic piston and which is under the initial tension of the spring arrangement substantially avoids the wearing of the threads of the draw rod, both during chucking and also during releasing of the shank. To chuck a shank, same is moved relative to the spindle into the receiving cone until the threaded portion of the draw rod is supported on the threaded portion of the shank and, through this, the draw rod is slightly lifted. The piston is then supplied with hydraulic pressure, which causes the sleeve to be pressed always downwardly against the initial tensioning force of the spring arrangement. Subsequently it is possible to screw the draw rod thread into the shank by means of the drive motor, whereby the draw rod will come to rest on the lower stop of the sleeve and then pull the shank firmly into the receiving cone. The hydraulic piston is thereafter de-pressurized and then the very strong spring arrangement effectively applies an additional force onto the conical shank and pulls same into the receiving cone with the large initial tensioning force. To release the shank, the piston is supplied with pressure and it moves the sleeve downwardly against the force of the spring arrangement until the draw rod rests on the upper stop. Further downward movement of the sleeve causes the shank to be pressed out of the receiving cone by the draw rod. Since the threads of the draw rod still engage the shank threads over their full length, practically no wear of the thread occurs and also the danger of threads breaking off is avoided. If an angle milling head which is connected to the spindle is supposed to be pivoted about the axis of the spindle into a different working position, first the connection between the angle milling head and the spindle housing is released and then the shank of the angle milling head is ejected in the above-described manner. The angle milling head now hangs on the draw rod, however, whereby the entire thread on the draw rod is in engagement with the thread of the shank and an overload of the thread connection is not possible. The angle milling head which now hangs freely rotatable on the draw bar can then be rotated into a different working position without any further auxiliary means and can again be lifted into the receiving cone by means of the draw rod.

BRIEF DESCRIPTION OF THE DRAWINGS

The invention is discussed in greater detail hereinafter in connection with an exemplary embodiment which is illustrated in the drawings, in which.

DETAILED DESCRIPTION

Figure 1:
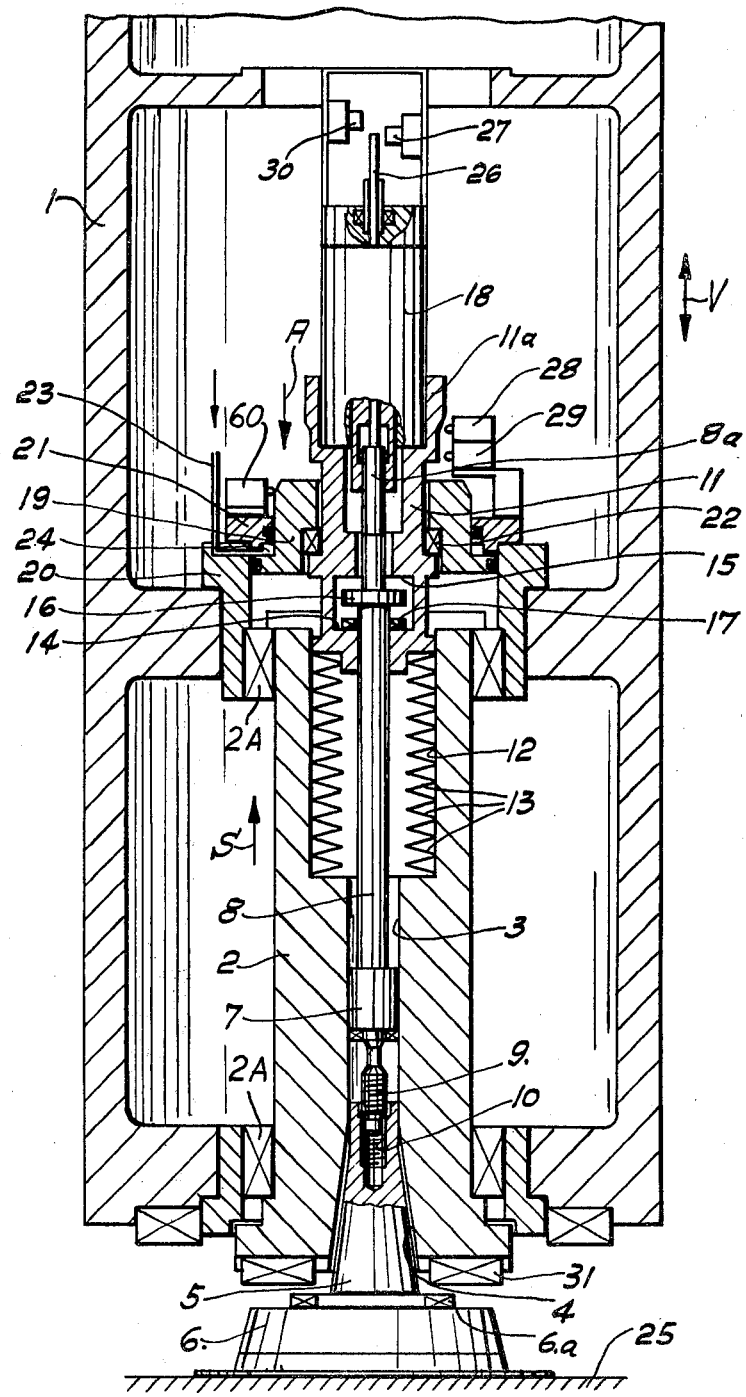
FIG. 1 is a longitudinal cross-sectional view of the apparatus as it receives a tool.

A spindle carriage of a milling machine, which carriage can be moved vertically in the directions V, is identified with reference numeral 1 in the drawings. The spindle carriage simultaneously forms a spindle housing in which a spindle 2 is supported rotatably by bearings 2A. The spindle 2 has a longitudinal opening 3 therethrough which has at its lower end a standard receiving cone 4 for the conical shank 5 of a tool 6. A draw rod 8 is supported for axial and rotatable movement in a friction bearing 7 provided in the opening 3. It carries at its lower end, which end faces the receiving cone 4, an externally threaded portion 9 which threadedly fits into a standardized internally threaded opening 10 in the conical shank 5.

The draw rod 8 is coaxially surrounded in its upper area by a spindle sleeve 11, the lower end of which sleeve 11 is movable in a cylindrical recess 12 of the spindle 2 and is supported on a spring arrangement 13 provided in the recess which is preferably formed of strong springs. The springs 13 apply onto the sleeve 11 an initial force which is directed upwardly away from the receiving cone 4 in the direction S. The sleeve 11 has a lower stop 14 and an upper stop 15 which are respectively formed by upwardly and downwardly facing annular shoulders in the sleeve 11, which annular shoulders are arranged at an axial distance from one another. The stops 14 and 15 cooperate with a collar 16 provided on the draw rod 8, and between the lower stop 14 and the collar 16 there is advantageously provided an axial roller bearing 17. The axial distance between the two stops or annular shoulders 14, 15 is larger than the axial length of the collar 16 so that the draw rod 8 is movable in an axial direction with respect to the sleeve 11 within a range which is limited by the stops 14, 15.

A drive motor 18 is secured advantageously at the upper end 11a of the sleeve 11, and the rotor thereof is connected to the upper end 8a of the draw rod 8 so as to be fixed against rotation with respect thereto but so that the upper end 8a of the draw rod 8 is movable in an axial direction with respect to the drive motor 18.

The sleeve 11 is advantageously surrounded concentrically by an annular piston 19 which is axially movable in a cylindrical piston sleeve 20 which concentrically surrounds the piston 19 and includes a lid 21. The sleeve 20 is mounted to the spindle housing 1 and the sleeve 11 is supported rotatably by the bearing 22 in the annular piston 19. Hydraulic fluid is contained in a chamber 24 between the piston 19 and the sleeve 20 and lid 21, and can be pressurized through a hydraulic pipeline 23 from a conventional and not-illustrated source, whereby the piston 19 and the sleeve 11 supported by the piston 19 can be moved downwardly in the direction A against the force of the spring arrangement 13.

For chucking a tool 6 which is supported on a base 25, the spindle carriage 1 is moved downwardly at a creeping speed. The conical shank 5 enters the receiving cone 4, such that the lower end of the draw rod 8 rests on the upper end of the shank 5 and thus the draw rod 8 is lifted into the position which is illustrated in FIG. 1. A control rod 26 which is provided at the upper end 8a of the draw rod 8 and which extends through the drive motor 18 is also moved upwardly and, by activating the switch 27, switches off the downward advance of the spindle carriage 1. Coupling tabs 31 on the lower end of the spindle 2 are now in engagement with coupling grooves 6a on top of the tool 6 and secure same against relative rotation. The chamber 24 is now pressurized, causing the piston 19 to move downwardly in the direction A, thereby pressing the sleeve 11 downwardly until the end switch 28 is operated by the annular collar 11a on the sleeve 11. The drive motor 18 is now switched on manually and the thread 9 of the draw rod 8 is screwed into the thread 10 of the shank 5. The draw rod 8 is thereby lowered until its collar 16 rests on the axial roller bearing 17, and further rotation of the draw rod 8 pulls the shank 5 tightly into the receiving cone 4. The drive motor 18 is automatically switched off through a conventional and not-illustrated torque-limiting means. If the chamber 24 is now rendered pressureless, then the spring arrangement 13 pressing the sleeve 11 upwardly effectively urges the shank 5 into the receiving cone 4 with an even greater force. The annular piston 19 is practically not shifted axially at all.

To release the tool 6, the chamber 24 is again supplied with hydraulic pressure. The annular piston 19 then moves downwardly until the switch 29 is closed by the collar 11a and interrupts this movement. Since the stroke of the piston 19 is larger than the possible range of movement of the collar 16 of the draw rod 8 between the stops 14 and 15, the collar 16 soon engages the upper stop 15 and, through this, the tool shank 5 is pressed out of its snug fit in the receiving cone 4. The tool 6 which is carried by the draw rod 8 now drops downwardly due to gravity until the collar 16 of the draw rod 8 again rests on the axial bearing 17. Since the thread 9 of the draw rod 8 is still screwed over its entire length into the thread 10 of the shank 5, damage of this threaded connection due to this drop is effectively avoided. For the further release of the tool 6, the spindle carriage 1 is now lowered until the tool 6 rests again on the base 25, after which the draw rod 8 moves upwardly with respect to the spindle 2 until the end switch 27 is again activated by control rod 26 and switches off the downward advance of the spindle carriage 1. The coupling grooves 6a still engage in this position the coupling tabs 31 of the spindle 2 and the tool 6 and spindle 2 are thus secured against relative rotation. The draw rod 8 is now rotated in the opposite direction by means of the drive motor 18 so that the thread 9 is screwed out of the threads 10 of the shank 5. The chamber 24 is then depressurized and the draw rod 8, sleeve 11 and piston 19 are returned by the spring arrangement 13 to an initial position indicated by the end switch 60. After lifting the spindle carriage 1 upwardly, the tool 6 can be moved away.

To chuck and release a light tool, its shank can be moved manually into the cone of the spindle. That is, the above-described relative movements between the tool and the spindle can in the case of a light tool be carried out manually. The chucking and releasing, however, occurs in the manner described above in connection with a heavy tool. Differing from this during chucking of a light tool, the shank 5 is introduced manually into the receiving cone 4 sufficiently far that the control rod 26 which is connected to the draw rod 8 operates the end switch 30 to switch on the drive motor 18. The braking tabs 31 and braking grooves 6a are already in engagement and secure the spindle and tool against relative rotation.

Figure 2:
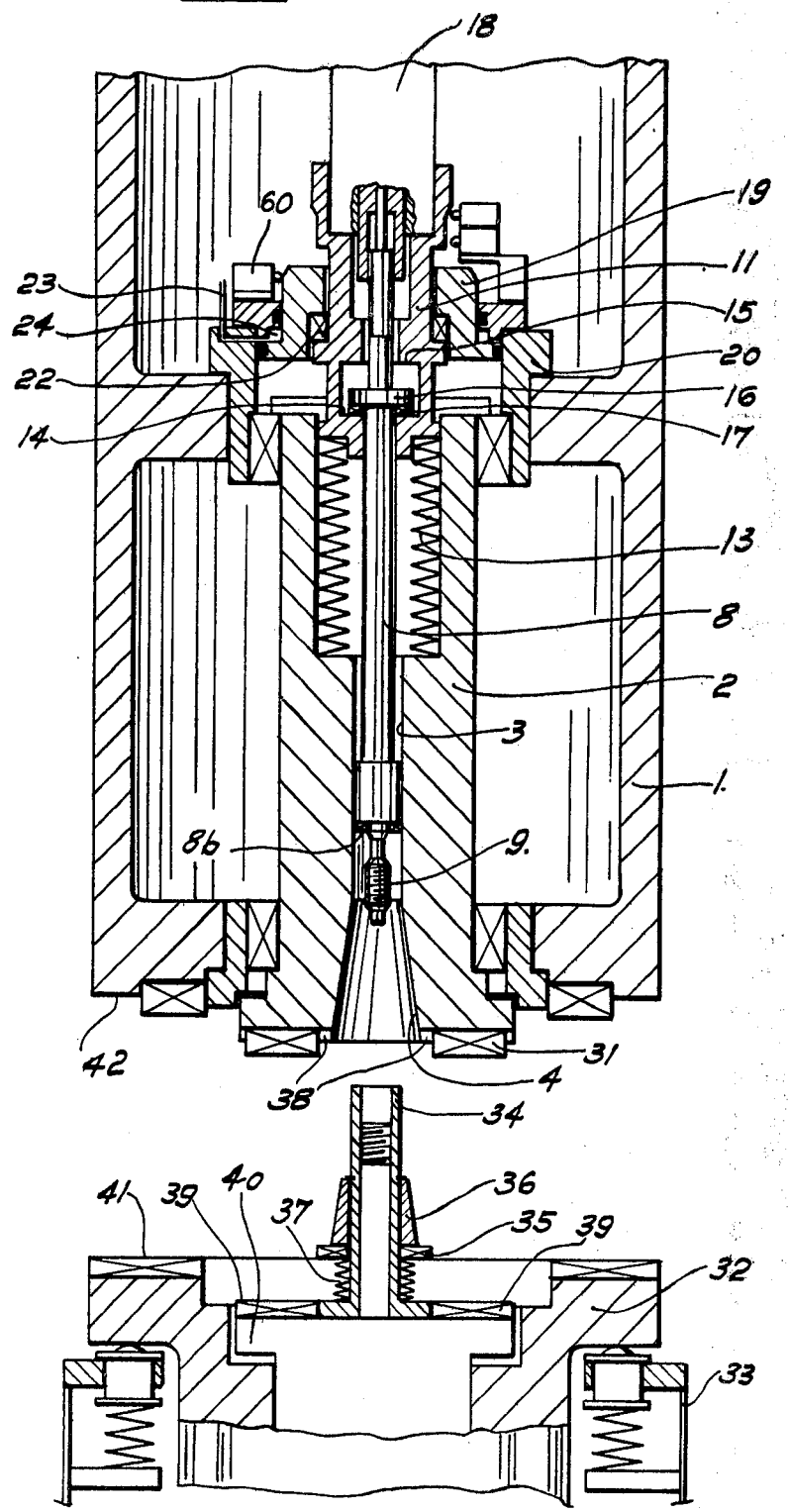
FIG. 2 is a longitudinal cross-sectional view of the apparatus of FIG. 1 in a non-chucked condition prior to receiving an angle milling head.

Angle milling heads are needed for many machining operations. The inventive apparatus offers here particular advantages in the function sequence and in operating safety, as will be discussed hereinafter in connection with FIG. 2.

An angle milling head 32 is moved under the spindle carriage 1 using a transport wagon 33, so that an internally threaded sleeve 34 which is provided on the angle milling head 32 is approximately in alignment with the axis of the spindle.

A conical shank 36 which is provided with percentering tabs 35 is supported movably on the thread sleeve 34 and is pressed upwardly relative to the sleeve 34 by springs 37. The spindle carriage 1 is moved at a slow speed toward the angle milling head 32 until the threaded portion 9 of the draw rod 8 rests on top of the threaded sleeve 34. This then lifts the draw rod 8 in the aforedescribed manner and the control rod 26 activates the switch 27 to switch off the advance of the spindle carriage 1. The rotary piston 19 is then supplied with pressure and moves in the aforedescribed manner. The spindle 2 is then rotated slowly by a conventional and not-illustrated drive mechanism until the precentering tabs 35 engage centering grooves 38 provided on the spindle 2. The coupling tabs 31 of the spindle 2 are then exactly in axial alignment with coupling grooves 39 on the drive shaft 40 of the angle milling head.

Subsequently, the threads 9 of the draw rod 8 are screwed into the thread sleeve 34 by the drive motor 18 in the manner described hereinabove and the angle milling head 32 is thereby lifted until the top of the thread sleeve 34 rests on the annular surface 8b of the draw rod 8. The hydraulic pressure in the chamber 24 which still acts onto the piston 19 is then switched off and the sleeve 11 is pressed upwardly by the spring arrangement 13 into an initial position which is indicated by the end switch 60. The top surface 41 of the angle milling head 32 thereby approaches the fastening surface 42, leaving only a small gap of approximately 0.5 mm. The angle milling head 32 can then be secured by not-illustrated clamping screws or hydraulically loaded clamping bolts to the spindle carriage 1.

The disassembly of the angle milling head 32 and spindle 2 is done in a manner similar to that described above in connection with the tool 6. If the angle milling head only needs to be swung about the axis of the spindle 2 into a different working position, first the fastenings (such as clamps) between the angle milling head 32 and the spindle carriage 1 are released. The chamber 24 is then supplied with pressurized fluid and the piston 19 is lowered. The spindle 2 and the drive shaft 40 of the angle milling head 32 are then slightly separated, but are still secured against relative rotation by the precentering tabs 35 of the resiliently supported conical shank 36, which precentering tabs 35 are in engagement with the centering grooves 38 of the spindle 2. The angle milling head 32 thus hangs from the draw rod 8 and can be pivoted by slow rotation of the spindle 2 without any further means into the desired working position. The cylinder chamber 24 is again de-pressurized, and the angle milling head 32 is lifted up close to the spindle carriage in the aforedescribed manner and is again fixedly connected to same through screws or clamping bolts.

Figure 3:
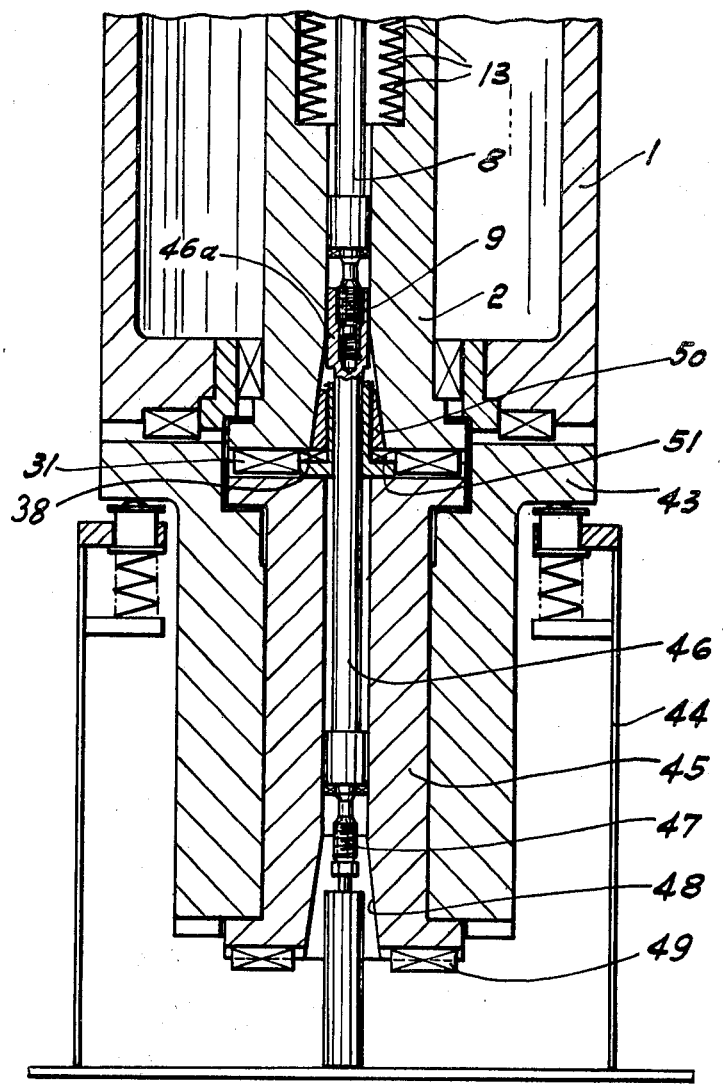
FIG. 3 is a longitudinal cross-sectional view of the apparatus as an adapter is attached.

Since the massive spindle carriage 1 often cannot enter the narrow recesses provided in some workpieces, adapters are known, the radial dimensions of which are smaller than the dimensions of the spindle carriage. An adapter 43 is illustrated in FIG. 3. The adapter 43 can be moved under the spindle carriage 1 by means of a transport wagon 44. The adapter 43 has a hollow drive spindle 45. A draw rod extension 46 is supported for axial and rotatable movement in the hollow drive spindle 45.

The draw rod extension 46 carries at its upper end an internally threaded sleeve 46a and on its lower end external threads 47 analogous to the threads 9 of the draw rod 8. The lower end of the drive spindle 45 is provided with a receiving cone 48 and coupling tabs 49 which respectively correspond with the receiving cone 4 and the coupling tabs 31 of the spindle 2. A conical shank 50 with precentering tabs 51 is movably supported on the upper end of the draw rod extension 46, which shank 50 is similar in structure and function with the corresponding part of the aforedescribed angle milling head 32.

To install the adapter 43 on the spindle carriage 1, the latter is moved to a distance of approximately 25 mm from the adapter 43, which adapter rests on the transport wagon 44. The spindle 2 is then driven at a creeping speed and the precentering tabs 51 engage the centering grooves 38. The spindle carriage 1 is then dropped still further and the adapter 43 is screwed or clamped to the spindle carriage. Subsequently, both parts are lifted up and the draw rod extension 46 and draw rod 8 are then raised by means of a not-illustrated mounting tool and activate the end switch 30 to switch on the drive motor 18. The thread 9 is screwed into the threaded sleeve 46a and thus the draw rod 8 is fixedly connected to the draw rod extension 46. The chucking and releasing of a tool on the adapter 43 occurs then by means of the draw rod extension 46 in exactly the same manner as has been described above in connection with FIG. 1.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination with a tool machine adapted for use with a tool means having a conical shank and an internally threaded opening in said conical shank, an apparatus for chucking and releasing said tool means, comprising:

hollow spindle carriage means supported for movement toward and away from an unchucked tool means;

an elongated hollow spindle rotatably supported in the interior of said spindle carriage means and having a receiving cone at one end thereof adapted to receive said conical shank of said tool means therein;

an elongated draw bar rotatably and axially movably mounted in said spindle carriage, and having an externally threaded portion at the end thereof adjacent the end of said spindle facing said tool means;

first means for rotatably driving said draw bar to effect a full threaded engagement of the threads on said externally threaded portion of said draw bar and in said internally threaded opening and for drawing said conical shank tightly into said receiving cone to thereby effect a chucking of said tool means; and second means for effecting, when said tool means is chucked in said spindle, a release of the connection between said conical shank and said receiving cone without altering said full threaded engagement between said externally threaded portion and said internally threaded opening whereby the weight of said tool means will be suspended from said full threaded engagement, said second means including:

a hollow spindle sleeve axially reciprocally movably mounted in said spindle carriage means for movement a first distance toward and away from said hollow spindle, said spindle sleeve having third means defining a cavity therein with opposed axially facing surfaces thereof defining stop surfaces;

said draw bar extending through said cavity means and having an enlarged collar means located in said cavity means between said opposed stop surfaces;

a limiting of said axial movement of said draw bar relative to said spindle sleeve to a second distance less than said first distance when said tool means is chucked due to a limiting engagement of said collar means with at least one of said stop surfaces; and drive means for reciprocally driving said spindle sleeve axially toward and away from said hollow spindle and effecting, during a movement of said spindle sleeve toward said hollow spindle, an engaging of said at least one stop surface with said collar means whereby a continued axial movement of said spindle sleeve toward said hollow spindle will effect an axial movement of said draw bar toward said receiving cone to effect said release of the connection between said conical shank and said receiving cone.

2. The combination according to claim 1, wherein resilient means are provided between said spindle sleeve and said spindle for resiliently resisting movement of said spindle sleeve toward said sleeve, whereby upon a chucking of said tool means, said resilient means additionally draws said conical shank into said receiving cone.

3. The combination according to claim 1, wherein an axial roller bearing is provided between one of said stop surfaces and said collar means.

4. The combination according to claim 1, wherein said first means is a drive motor fixedly connected to one end of said spindle sleeve, which end is remote from said spindle.

5. The combination according to claim 1 or 3, wherein said tool means is an adapter and wherein a draw rod extension is supported for rotatable and axial movement in a hollow spindle of said adapter which can be connected to said spindle carriage, said draw rod extension having at one end thereof a threaded sleeve into which said externally threaded portion is received and carries at its lower end additional threads which correspond to externally threaded portion.

6. In combination with a tool machine adapted for use with a tool means having a conical shank and an internally threaded opening in said conical shank, an apparatus for chucking and releasing said tool means, comprising:

hollow spindle carriage means supported for movement toward and away from an unchucked tool means;

an elongated hollow spindle rotatably supported in the interior of said spindle carriage means and having a receiving cone at one end thereof adapted to receive said conical shank of said tool means therein;

an elongated draw bar rotatably and axially movably mounted in said spindle carriage, and having an externally threaded portion at the end thereof adjacent the end of said spindle facing said tool means;

first means for rotatably driving said draw bar to effect a full threaded engagement of the threads on said externally threaded portion of said draw bar and in said internally threaded opening and for drawing said conical shank tightly into said receiving cone to thereby effect a chucking of said tool means; and second means for effecting, when said tool means is chucked in said spindle, a release of the connection between said conical shank and said receiving cone without altering said full threaded engagement between said externally threaded portion and said internally threaded opening whereby the weight of said tool means will be suspended from said full threaded engagement, said second means including a spindle sleeve, an annular piston and a cylindrical sleeve, said spindle sleeve being concentrically surrounded by said annular piston said annular piston being axially movable in said cylindrical sleeve which concentrically surrounds said spindle sleeve.

7. The combination according to claim 6, wherein cylindrical sleeve is connected to said spindle carriage and said spindle sleeve is rotatably supported in said annular piston.

8. The combination according to claim 6, wherein said first means is a drive motor fixedly connected to one end of said spindle sleeve, which end is remote from said spindle.

9. The combination according to claim 6, wherein said second means further includes:

said spindle sleeve being hollow and axially reciprocally movably mounted in said spindle carriage means for movement a first distance toward and away from said hollow spindle, said spindle sleeve having third means defining a cavity therein with opposed axially facing surfaces thereof defining stop surfaces;

said draw bar extending through said cavity means and having an enlarged collar means located in said cavity means between said opposed stop surfaces;

a limiting of said axial movement of said draw bar relative to said spindle sleeve to a second distance less than said first distance when said tool means is chucked due to a limiting engagement of said collar means with at least one of said stop surfaces; and drive means for reciprocally driving said spindle sleeve axially toward and away from said hollow spindle and effecting, during a movement of said spindle sleeve toward said hollow spindle, an engaging of said at least one stop surface with said collar means whereby a continued axial movement of said spindle sleeve toward said hollow spindle will effect an axial movement of said draw bar toward said receiving cone to effect said release of the connection between said conical shank and said receiving cone.

10. The combination according to claim 9, wherein resilient means are provided between said spindle sleeve and said spindle for resiliently resisting movement of said spindle sleeve toward said sleeve, whereby upon a chucking of said tool means, said resilient means additionally draws said conical shank into said receiving cone.

11. The combination according to claim 9, wherein an axial roller bearing is provided between one of said stop surfaces and said collar means.

* * * * *